May 1, 1928.
G. A. BLAUVELT
1,667,965
AUTOMOBILE HEADLIGHT CONTROL SWITCH
Filed April 7, 1926
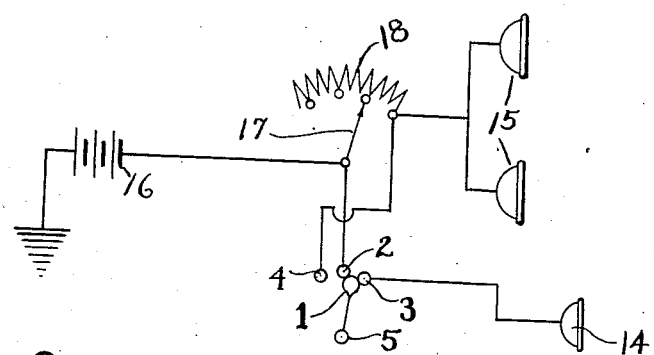
FIG.1.
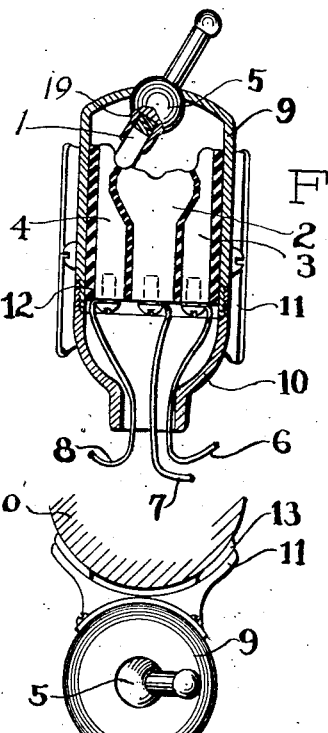
FIG.2.
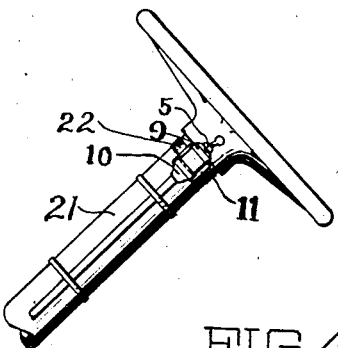
FIG.4.
FIG.3.
Witnesses:-
1. Laurence J. Van Nattan
2. Hazel J. Baker.
George Allen Blauvelt
INVENTOR.
BY
A.B.McCall
ATTORNEYS.

Patented May 1, 1928.

1,667,965

UNITED STATES PATENT OFFICE.

GEORGE ALLEN BLAUVELT, OF SPRINGFIELD, ILLINOIS.

AUTOMOBILE HEADLIGHT-CONTROL SWITCH.

Application filed April 7, 1926. Serial No. 100,225.

This invention relates to a class of switches for the transfer of electric current which may be especially adapted to use in controlling light circuits for automobiles and the like.

One of the purposes of this invention is to provide a switch that may be conveniently and artistically mounted on the steering column of an automobile for manipulation in the control of automobile headlights and spotlights.

A particular object of my invention is to provide a convenient switch for strengthening the light in a spot light at a time when the headlights of the car are turned down.

I attain the objects of my invention by the device described in detail in the annexed specifications, recited in the claims and illustrated in the accompanying drawings in which like reference numerals refer to the same structural parts in the several figures.

Referring to the figures:

Figure 1 is a circuit diagram showing an automobile lighting circuit in connection with which this switch is adapted to be used.

Figure 2 is a longitudinal section of the switch casing exposing to view the interior of the switch of my invention.

Figure 3 is a top end view of the switch of my invention.

Figure 4 is a side view of a steering column and steering wheel showing mounted thereon the switch of my invention.

Referring now to the several elements of detail in the device of my invention I wish to point out the method of operating the device in the manner preferred.

When an automobile is being driven along the road it is quite frequently necessary to dim the two front lights and when this is done it is desirable to have a stronger light along the side of the road carried by the spot light in order to provide suitable protection and guidance when driving at night.
A convenient way to accomplish this result in a circuit diagram is illustrated in Fig. 1 in which switch lever —5— controls the contact knob —1— which may be switched from left to right either to complete a circuit with the spot light —14— from the lighting battery —16— or to break that circuit and throw all the strength of the lighting circuit on the front headlights of the car. The intensity of light for the front headlights —15— may be varied by the manipulation of switch —17— on rheostat —18—.

It will be noted that switch knob —1— is always in contact with terminal —2— whether it touches terminal —3— or —4—.

Referring now to the details of construction of my switch and particularly the operating contacts in Fig. 2 is illustrated a switch lever —5— controlling a springy actuated switch contact knob —1—.

When knob —1— is seated in the central depression of terminal —2— the circuit makes no contact with any light and when the switch is thrown so as to make contact with terminal —4— it also makes contact with central terminal —2—; likewise when the switch lever —5— is thrown to the opposite side knob —1— completes a contact between central terminal —2— and terminal —3—.

A plunger spring —19— and a contact knob —1— are telescopically mounted within a tubular sleeve in switch lever —5— while switch lever —5— is held into normal operating position through the urgency of spring —19— and is pivotally movable on the principle of a ball and socket joint within a snugly fitting aperture in the top of casing —9—.

The terminals —2—3— and —4— within casing —9— are suitably insulated by hard rubber —12—.

Casing —9— is mounted on base —11— and securely fastened thereto and after wires —6—7— and —8— are secured to terminals —2—3— and —4— respectively cap —10— of the casing is adapted to be screwed on or otherwise secured to casing —9—.

In order to provide a suitable support for base —11— pads —13— are provided under the base to make a good snug fitting contact with the steering column —20—.

It will be seen that the switch of my invention may be artistically and conveniently mounted and secured to a steering column —21— either through a strap or spring to hold it on the column as is shown at —22— in Fig. 4.

Having thus described the nature of my invention what I claim is:

A headlight control switch of the character described comprising in cooperative combination a ball and socket mounted control lever provided with a resiliently mounted contact member; a central and two side electrodes, said central electrode provided with a receiving depression for the accommodation of said resilient contact member on said lever, said side electrodes insulatably spaced from said central electrode and provided each with cooperating depressions adapted to cooperate with similar depressions in said central electrode on the edge thereof for the accommodation of said resilient contact member when in normal operation as a switch; whereby said contact member may normally provide electric connection alternately and optionally between said central electrode and either of said oppositely disposed side electrodes.

In witness whereof, I hereunto set my hand this 27 day of February, 1926.

GEORGE ALLEN BLAUVELT.